(12) United States Patent
Lee et al.

(10) Patent No.: US 11,260,770 B2
(45) Date of Patent: Mar. 1, 2022

(54) MOVABLE POWER GENERATING SYSTEM AND METHOD FOR VEHICLE

(71) Applicants: HYUNDAI MOTOR COMPANY, Seoul (KR); KIA MOTORS CORPORATION, Seoul (KR)

(72) Inventors: Jin-Hyung Lee, Seoul (KR); Deok-Hwan Seo, Incheon (KR); Jong-Chan Jun, Hwaseong-si (KR); Kwon-Hyoung Choi, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 513 days.

(21) Appl. No.: 16/269,896

(22) Filed: Feb. 7, 2019

(65) Prior Publication Data
US 2019/0241091 A1 Aug. 8, 2019

(30) Foreign Application Priority Data

Feb. 8, 2018 (KR) .................. 10-2018-0015698

(51) Int. Cl.
*B60L 55/00* (2019.01)
*B60L 50/51* (2019.01)
*B60L 50/53* (2019.01)

(52) U.S. Cl.
CPC ............... *B60L 55/00* (2019.02); *B60L 50/51* (2019.02); *B60L 50/53* (2019.02)

(58) Field of Classification Search
None
See application file for complete search history.

(56) References Cited

U.S. PATENT DOCUMENTS

| 2012/0187758 | A1* | 7/2012 | Boskovitch | B60L 15/007 |
| | | | | 307/10.1 |
| 2014/0303821 | A1* | 10/2014 | Oda | B60L 58/30 |
| | | | | 701/22 |
| 2016/0046202 | A1* | 2/2016 | Yamamoto | B60L 53/305 |
| | | | | 307/10.1 |
| 2017/0349054 | A1* | 12/2017 | Yang | B60L 50/13 |

FOREIGN PATENT DOCUMENTS

| KR | 101619535 B1 | 5/2016 |
| KR | 101706880 B1 | 2/2017 |

* cited by examiner

*Primary Examiner* — Jared Fureman
*Assistant Examiner* — Aqeel H Bukhari
(74) *Attorney, Agent, or Firm* — McDonnell Boehnen Hulbert & Berghoff LLP

(57) ABSTRACT

A movable power generating system for a vehicle may include an inverter for receiving power from a battery in a vehicle to generate AC power, a motor for receiving the AC power from the inverter, a switch block connected to the output terminal of the inverter and for branching the AC power, and an external power supply unit connected to the switch block and for outputting the AC power.

17 Claims, 11 Drawing Sheets

MOVABLE POWER GENERATING SYSTEM AND METHOD FOR VEHICLE

CROSS REFERENCE TO RELATED APPLICATION

This application claims priority to Korean Patent Application No. 10-2018-0015698 filed on Feb. 8, 2018, which is incorporated herein by reference in its entirety.

BACKGROUND

Field of the Disclosure

The present disclosure relates to a movable power generating technology for a vehicle, and more particularly, to a movable power generating system and method for a vehicle capable of supplying high capacity power to the outside using the vehicle.

Description of Related Art

In general, high capacity power is supplied to the outside by using a vehicle. For example, a vehicle supplies AC power to the outside from a battery or an internal combustion engine through a separate step-up converter and a power converting device. Alternatively, the vehicle performs a single-phase output to a grid by using an inverter.

Therefore, there is a disadvantage in that a cost greatly increases due to a method of adding a separate power electronic part in order to generate AC power. In particular, in some cases, it is limited to an electric vehicle, and there is a problem in that since only single-phase output is possible to supply only small capacity power to a power grid, it may not be used as an independent power source.

In addition, there is a risk in that the vehicle moves while supplying power to the outside because the electrical connection with a motor is not disconnected.

SUMMARY

The present disclosure is intended to solve the above problems, and an object of the present disclosure is to provide a movable power generating system and method for a vehicle capable of supplying desired high capacity power to the outside without adding a separate power electronic part.

In addition, another object of the present disclosure is to provide a movable power generating system and method for a vehicle capable of securing stability of the vehicle while supplying power through separation from a drive motor.

For achieving the objects, the present disclosure provides a movable power generating system for a vehicle capable of supplying high capacity power to the outside without adding a separate power electronic part.

The movable power generating system for the vehicle includes: an inverter for receiving power from a battery in a vehicle to generate alternating current (AC) power;
  a motor for receiving the AC power from the inverter;
  a switch block connected to the output terminal of the inverter and for branching the AC power; and
  an external power supply unit connected to the switch block and for outputting the AC power.

At this time, the movable power generating system comprises a vehicle controller for determining selectively an operation of the vehicle as a traveling mode for switching the switch block to the motor side or an external power supply mode for switching the switch block to the external power supply unit side.

In addition, the inverter may be controlled by a constant voltage output according to an input required output voltage value in the external power supply mode.

In addition, the input required output voltage value may be a predetermined basic voltage which may be determined by country or technical standard.

In addition, the input required output voltage value is a predetermined value stored in a memory within the vehicle or is input through an Audio Visual Navigation (AVN) or a communication terminal connected to the vehicle.

In addition, a plurality of the inverters, a plurality of the switch blocks, and a plurality of the motors may be configured, and the movable power generating system comprises a vehicle controller for determining selectively an operation of the vehicle as an entire traveling mode for switching the switch blocks to the motors side, traveling and external power supply modes for switching some of the switch blocks to some side of the motors and the remainder of the switch blocks to the external power supply unit side, or an external power supply mode for switching all the switch blocks to the external power supply unit side.

In addition, the external power supply unit may be an external connecting cable for connecting to an outlet or an external grid.

On the other hand, another embodiment of the present disclosure may provide a movable power generating system for the vehicle including a motor for generating AC power according to the driving of an engine in a vehicle and supplying the AC power to an inverter; a switch block connected to the output terminal of the inverter and for branching the AC power; and an external power supply unit connected to the switch block and for outputting the AC power.

At this time, the operation of the vehicle may be composed of a traveling mode for switching the switch block to the motor side and an external power supply mode for switching the switch block to the external power supply unit side, and the external power supply mode may be composed of a battery discharge mode for switching the switch block to the external power supply unit side according to the charged state of a battery and a battery charge hold mode for connecting the switch block to the motor and the external power supply unit side.

In addition, the battery charge hold mode may drive an engine with an engine torque and an engine revolution per minute (RPM) that are pre-calculated to satisfy the output of the external power supply unit and the required charge amount of the battery.

At this time, the battery charge hold mode may control the inverter through the motor regenerative torque calculated according to the driving of the engine.

In addition, the charge required power of the battery in the battery charge hold mode may be zero.

In addition, the motor regenerative torque may be calculated by using the product of a motor inverter regenerative efficiency and a motor RPM and the sum of an external power supply load and a battery charge required power.

In addition, the engine torque may be a value obtained by dividing the motor regenerative torque by motor engine shift efficiency, and the engine RPM may be a value obtained by dividing the motor RPM by an engine motor shift ratio.

On the other hand, still another embodiment of the present disclosure may provide a movable power generating system for a vehicle including an inverter for receiving power of a fuel cell in a vehicle to generate AC power; a motor for receiving the AC power from the inverter; a switch block connected to the output terminal of the inverter and for branching the AC power; and an external power supply unit connected to the switch block and for outputting the AC power.

At this time, in the battery discharge mode, the battery alone may supply power to the inverter according to an input required output voltage value.

In addition, the battery charge hold mode may drive the fuel cell in order to satisfy the output of the external power supply unit and the required charge amount of the battery.

On the other hand, yet another embodiment of the present disclosure may provide a movable power generating method for a vehicle including generating AC power by receiving power from a battery in a vehicle by an inverter; receiving the AC power from the inverter by a motor; and outputting the AC power to an external power supply unit connected to a switch block by branching the AC power by the switch block connected to the output terminal of the inverter.

According to the present disclosure, it is possible to supply high capacity power to the outside by using a vehicle equipped with a motor inverter.

In addition, as another effect of the present disclosure, it is possible for a vehicle to operate as a movable power generator rather than a moving means, and to generate electrical energy from various energy sources (battery, internal combustion engine, fuel cell, and the like) to supply it to the outside.

In addition, as still another effect of the present disclosure, it is possible to function as a high capacity generator in various external sites.

In addition, as yet another effect of the present disclosure, it is possible to supply power to the outside even while the vehicle mounted with a plurality of motors-inverters travel.

DETAILED DESCRIPTION

Figure 1:
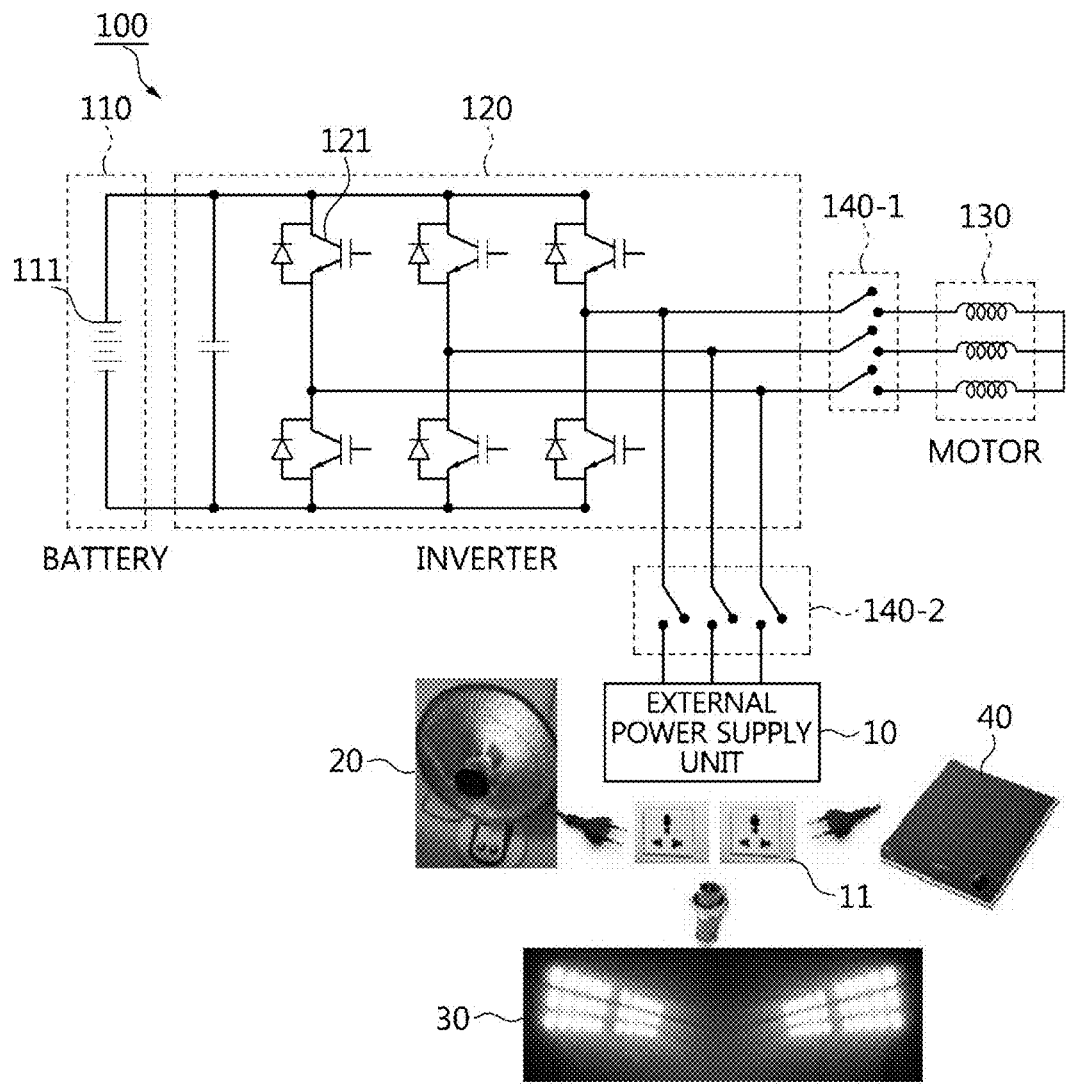
FIG. 1 is a conceptual diagram of a movable power generating system for a vehicle according to an embodiment of the present disclosure.

Various modifications and various forms may be made in the present disclosure, so that specific embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like may be used to illustrate various components, but the components should not be limited by the terms. The terms are used to differentiate one element from another.

For example, a first component may be referred to as a second component, and similarly, the second component may be also referred to as the first component without departing from the scope of the present disclosure. The terms "and/or" includes a plurality of related listed items or any of a plurality of related listed items.

Unless otherwise defined, all terms including technical and scientific terms used herein have the same meaning as commonly understood by one of ordinary skill in the art to which the present disclosure belongs.

It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, a movable power generating system and method for a vehicle according to an embodiment of the present disclosure will be described in detail with reference to the accompanying drawings.

FIG. 1 is a conceptual diagram of a movable power generating system for a vehicle according to an embodiment of the present disclosure. Referring to FIG. 1, a movable power generating system for the vehicle 100 may be configured to include a battery 110, an inverter 120 for generating AC power by receiving power from the battery 110, a motor 130 for driving by receiving the AC power from the inverter 120, switch blocks 140-1, 140-2 connected to the output terminal of the inverter 120 and for branching the AC power, an external power supply unit 10 connected to the switch blocks 140-1, 140-2 and for outputting the AC power, and the like.

The battery 110 includes a battery cell 111, which is connected in series and/or in parallel and may become a high-voltage battery cell for an electric vehicle such as a nickel metal battery cell, a lithium ion battery cell, a lithium polymer battery cell, all-solid-state battery cell, or the like. In general, a high-voltage battery is a battery used as a power source for moving the electric vehicle and refers to a high voltage of 100V or more. However, it is not limited thereto, and a low voltage battery is also possible.

The battery cell may be designed as a cylindrical cell, a prismatic cell, a pouch-shaped cell, or the like. The pouch-shaped cells include a flexible cover composed of a thin film, and the electrical components of the battery cell are disposed in the cover.

In particular, the pouch-shaped cells are used to implement the use of an optimum space in one battery cell. The pouch-shaped cells are also characterized by low weight as well as high capacity.

The edges of the pouch-shaped cells include a sealing joint (not illustrated). That is, the sealing joint connects two thin films of the battery cells, and the thin films include additional parts in a cavity formed thereby.

In general, the pouch-shaped cells may also contain electrolytic solution, such as a lithium secondary battery or a nickel-hydrogen battery.

The inverter 120 converts DC power from the battery 110 into AC power (i.e., three-phase power) to provide it to the motor 130. For this purpose, a semiconductor element 121 or the like is configured therein. The output of the inverter 120 varies from several tens to hundreds of kilowatts according to the type of the vehicle, and it is advantageous to easily control a desired output voltage. It is usually enough power to use household appliances 20, 40. In addition, since a commercial vehicle is equipped with a high capacity inverter/battery, it is possible to produce three-phase power of the extent that may be supplied to a lighting device 30, or the like at a construction site or an external performance.

The switch block is composed of a first switch 140-1 and a second switch 140-2. The first switch 140-1 is interposed between the output terminal of the inverter 120 and the input terminal of the motor 130, and the second switch 140-2 is interposed between the output terminal of the inverter 120 and the external power supply unit 10. The switch block may be configured to branch the three-phase output terminal of the inverter 120 to the motor 130 side and the external power supply unit 10 so that the two branched three-phase wirings may be independently turned ON/OFF. Of course, a single-phase wiring is also possible.

However, the switches 140-1, 140-2 use a power relay as a switching element, but is not limited thereto, and may use a semiconductor switching element, such as a Field Effect Transistor (FET), a Metal Oxide Semiconductor FET (MOSFET), an Insulated Gate Bipolar Transistor (IGBT), and a power rectifier, a thyristor, a Gate Turn-Off (GTO) thyristor, a Triode for alternating current (TRIAC), a Silicon Controlled Rectifier (SCR), and an Integrated Circuit (IC) circuit. In particular, in the semiconductor element, a bipolar, a power Metal Oxide Silicon Field Effect Transistor (MOSFET) element, or the like may be used. The power MOSFET element performs a high-voltage, high-current operation and has a Double-Diffused Metal Oxide Semiconductor (DMOS) structure unlike a general MOSFET.

The switches can be arranged in a row.

The external power supply unit 10 may also be simply composed of an outlet, and may be composed of a connecting cable for connecting to a grid.

Figure 2:
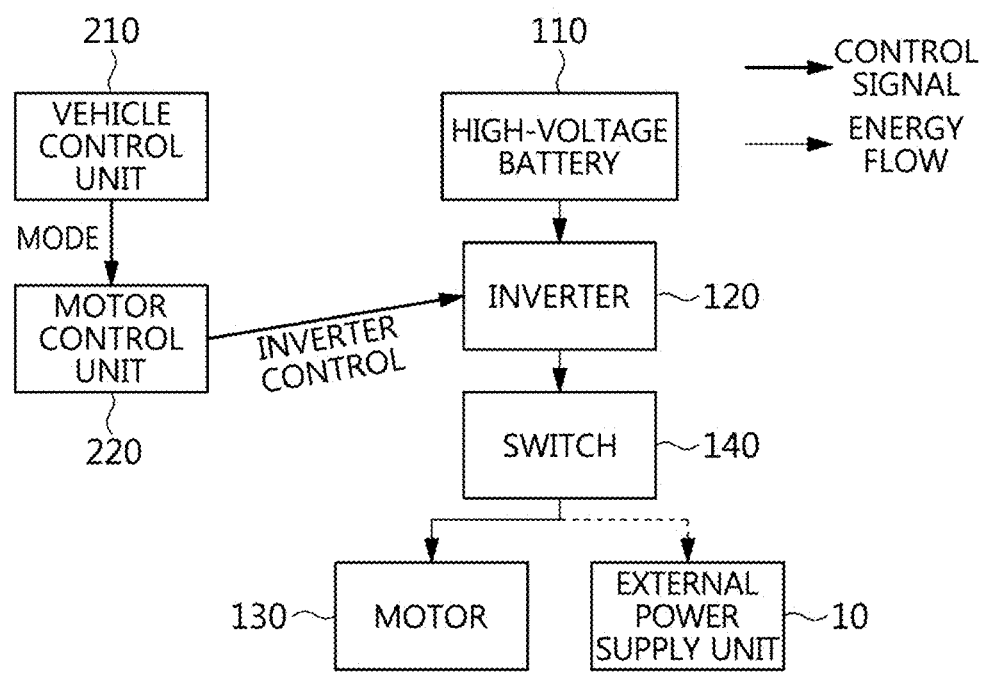
FIG. 2 is a block diagram of a movable power generating system for a vehicle using a single motor and inverter according to an embodiment of the present disclosure.

FIG. 2 is a block diagram of a movable power generating system for a vehicle using a single motor and inverter according to an embodiment of the present disclosure. Referring to FIG. 2, a vehicle control unit 210 instructs a motor control unit 220 for controlling the inverter for driving the motor by the vehicle control unit 210 by separating a traveling mode and an external power supply mode. Although the motor 130 and the motor control unit 220 are illustrated separately in FIG. 2 for convenience of understanding, the motor control unit 220 may be combined with the motor 130 together.

The traveling mode and the external power supply mode are separated by instruction command signals which are generated in controllers such as VCU (Vehicle Control Unit), HCU (Hybrid Control Unit), etc. The instruction command signals are generated by a user input information for operating an external power supply. The user input information is produced using a special switch, a voice, a touch screen, or a remote control for a smart device. In other words, the external power supply operation is not activated simply by connecting an external power supply unit.

However, when only an inverter is provided within the vehicle and the traveling mode and the external power supply mode are not provided simultaneously, the user input information for operating the external power supply is set as not available during vehicle traveling which is using the motor or always available for using the motor.

In addition, in case that the vehicle enters into the external power supply mode, the vehicle can be changed to enable the traveling mode when an Off input for not operating the external power supply is generated.

In addition, when at least two inverters are provided within the vehicle, an On input for operating the external power supply is available during the vehicle traveling. However, some of the motors are not available any more. If the VCU is using all motors for the vehicle traveling, the vehicle does not enter into the external power supply mode.

Figure 3:
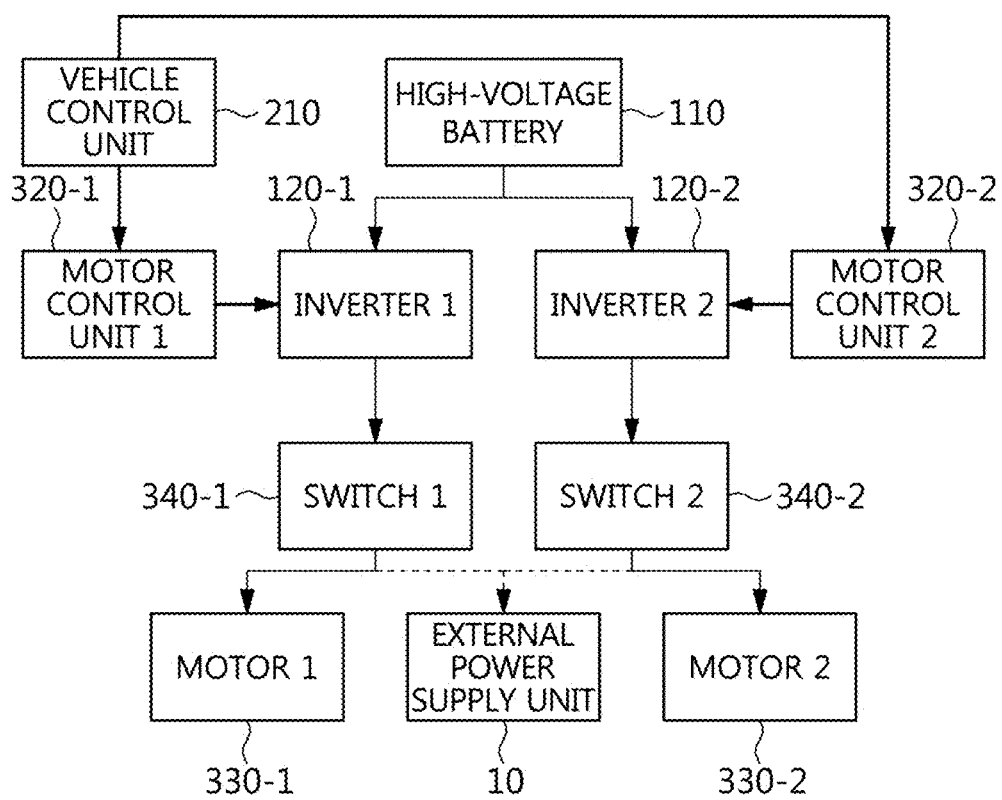
FIG. 3 is a block diagram of a movable power generating system for a vehicle using a plurality of motors and inverters according to another embodiment of the present disclosure.

Referring to FIG. 2, the motor control unit 220 switches the switch block 140 to the motor side in the traveling mode, and performs a drive control. Of course, the switch block 140 is composed of the first switch 140-1 and the second switch 140-2, as illustrated in FIG. 3. In the external power supply mode, the motor control unit 220 switches the switch to the external power supply unit 10 side, and controls the inverter 120 with the required constant voltage output.

The required input required output voltage value may use a basic voltage by country, and may be input through an Audio Visual Navigation (AVN) that a user may input into a vehicle or a communication terminal (smart phone, or the like) connected to the vehicle, and this may be transmitted to the motor control unit 220 through the vehicle control unit 210, or may be directly transmitted.

FIG. 3 is a block diagram of a movable power generating system for a vehicle using a plurality of motors and inverters according to another embodiment of the present disclosure. Referring to FIG. 3, the vehicle control unit 210 instructs first and second motor control units 320-1, 320-2 for controlling first and second inverters 120-1, 120-2 for driving the motor by separating the entire traveling mode, the traveling and external power supply modes, and the external power supply mode.

The first and second motor control units 320-1, 320-2 switch first and second switch blocks 340-1, 340-2 of which the switch block 140 are composed to first and second motors 330-1, 330-2, and perform only a drive control in the entire traveling mode.

In the traveling and external power supply modes, the first and second motor control units 320-1, 320-2 switch the first or second switch blocks 340-1, 340-2 to the external power supply unit 10 side, and one of the first and second inverters 120-1, 120-2 connected to one of the first and second motors 330-1, 330-2 performs a drive control, and the other inverter connected to the external power supply unit 10 side is controlled by the required constant voltage output. That is, the first inverter 120-1 and the first switch block 340-1 drive the first motor 330-1, and the second switch block 340-2 is switched to connect the output of the second inverter 120-2 to the external power supply unit 10 side.

The required input required output voltage value may use a basic voltage by country, and may be input through an AVN that a user may input to a vehicle or a terminal (smart phone, or the like) connected to the vehicle, and this may be transmitted to the first and second motor control units 320-1, 320-2 through the vehicle control unit 210, or may be directly transmitted to the first and second motor controllers 320-1, 320-2.

Figure 4:
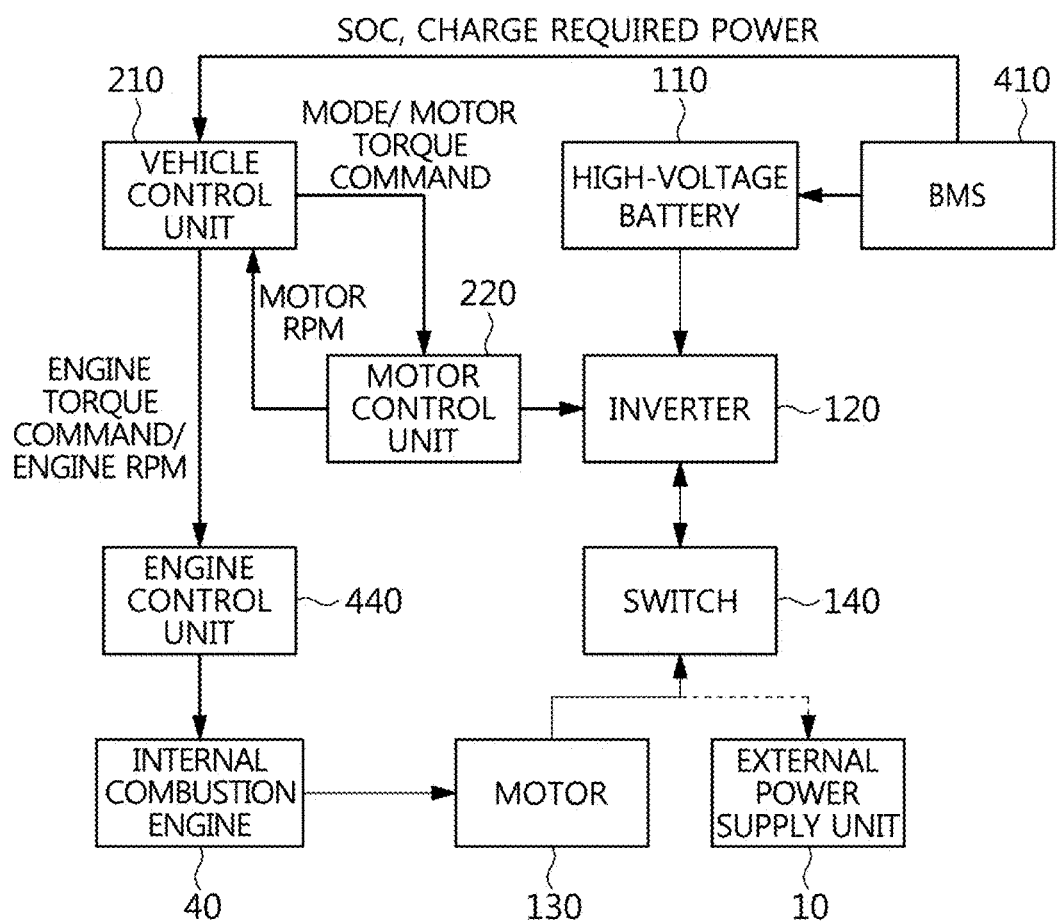
FIG. 4 is a block diagram of a movable power generating system in a hybrid vehicle according to still another embodiment of the present disclosure.

FIG. 4 is a block diagram of a mobile power generating system in a hybrid vehicle according to still another embodiment of the present disclosure. Referring to FIG. 4, the vehicle control unit 210 instructs the motor control unit 220 for controlling the inverter 120 for driving the motor by separating the traveling mode and the external power supply mode. The external power supply mode is divided into a battery discharge mode and a battery charge hold mode.

The motor control unit 220 switches the switch block 140 to the motor 130 side in the traveling mode, and performs a drive control.

In the external power supply mode, a Battery Management System (BMS) 410 transmits the charged state of the battery 110 to the vehicle control unit 210 to determine the charge/discharge/hold modes of the battery 110. Examples of information on the charge state include a State Of Charge (SOC), a State Of Health (SOH), a Depth Of Discharge (DOD), and a State Of Function (SOF), and the like.

In the battery discharge mode, the vehicle control unit 210 switches the switch block 140 to the external power supply unit 10 side through the motor control unit 220, and controls the inverter 120 with the required constant voltage output.

In the battery charge hold mode, the vehicle control unit 210 connects the switch block 140 to both the motor 130 and the external power supply unit 10 side through the motor control unit 220, and drives an engine 40 with the engine torque and the engine revolution per minute (RPM) through an engine control unit 440 in order to satisfy the output of the external power supply unit 10 and the required charge amount of the battery 110. At the same time, the vehicle control unit 210 calculates the motor regenerative torque required therefor to control the inverter 120 and performs the charge of the battery 110 simultaneously with external power supply. At this time, in the battery charge hold mode, the charge required power of the battery 110 may be zero.

The required input required output voltage value may use a basic voltage by country, and may be input through an AVM that a user may input to a vehicle or a terminal (smart phone, or the like) connected to the vehicle, and this may be transmitted to the motor control unit 220 through the vehicle control unit 210, or may be directly transmitted to the motor control unit 220.

Figure 5:
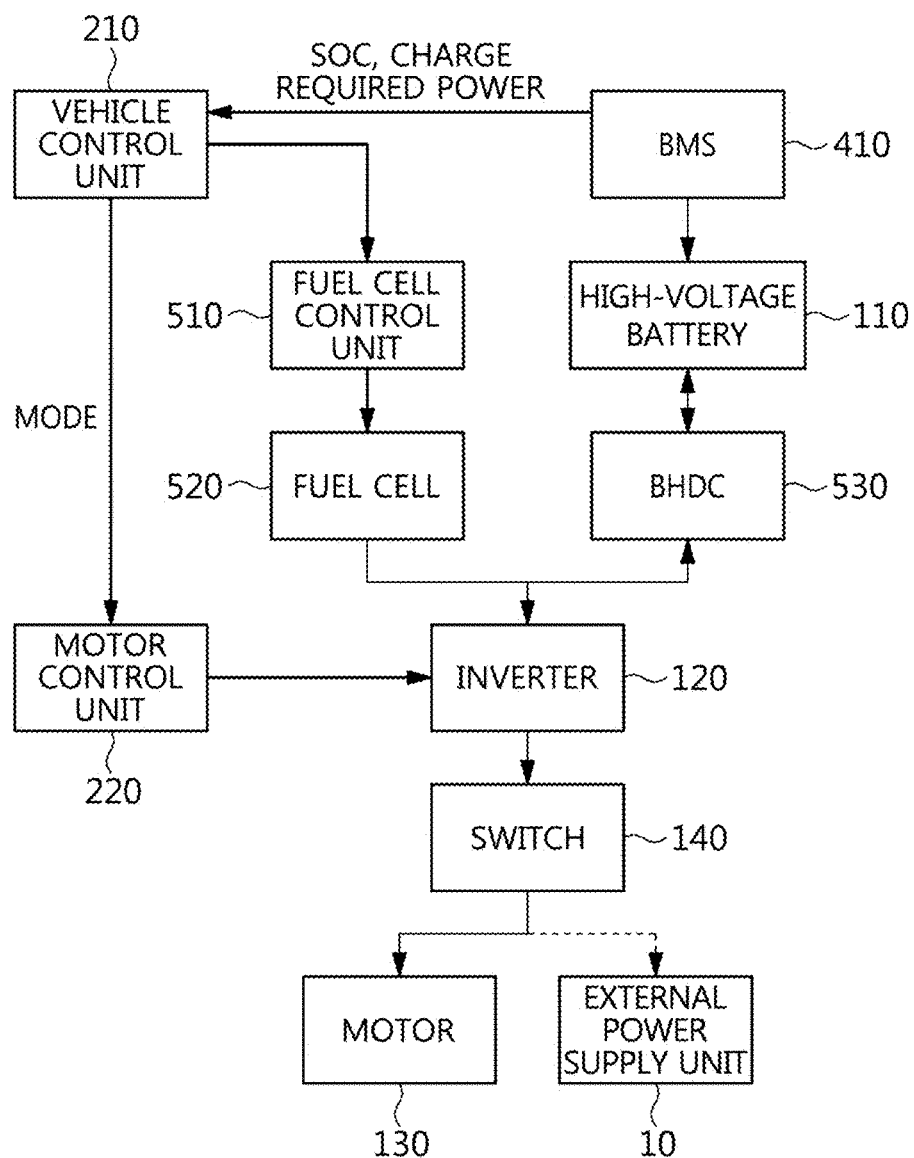
FIG. 5 is a block diagram of a movable power generating system in a fuel cell vehicle according to yet another embodiment of the present disclosure.

FIG. 5 is a block diagram of a movable power generating system in a fuel cell vehicle according to yet another embodiment of the present disclosure. Referring to FIG. 5, the vehicle control unit 210 of the fuel cell vehicle instructs the motor control unit 220 for controlling the inverter 120 for driving the motor by separating the traveling mode and the external power supply mode.

The motor control unit 220 switches the switch block 140 to the motor 130 side in the traveling mode, and performs a drive control. In the external power supply mode, the motor control unit 220 switches the switch block 140 to the external power supply unit 10 side, and controls the inverter 120 with the required constant voltage output.

The required input required output voltage value may use a basic voltage by country, and may be input through an AVN that a user may input to a vehicle or a communication terminal (smart phone, or the like) connected to the vehicle. This may be transmitted to the motor control unit 220 through the vehicle control unit 210 or may be directly transmitted to the motor control unit 220.

The vehicle control unit 210 receives a charge state (e.g., SOC) from the BMS 410 of the battery 110 to determine the battery charge/discharge/charge hold modes.

In the battery discharge mode, the battery 110 alone supplies power to the inverter 120 to supply external power.

In the battery charge hold mode, a fuel cell is operated to control a fuel cell 520 through a vehicle control unit 510 in order to satisfy the output of the external power supply unit 10 and the required charge amount of the battery 110. At this time, in the battery charge hold mode, the charge required power of the battery 110 may be zero. A Bidirectional DC/DC converter (BHDC) 530 is interposed between the fuel cell 520 and the battery 110 in order to control the charge and discharge of the battery 110.

Figure 6:
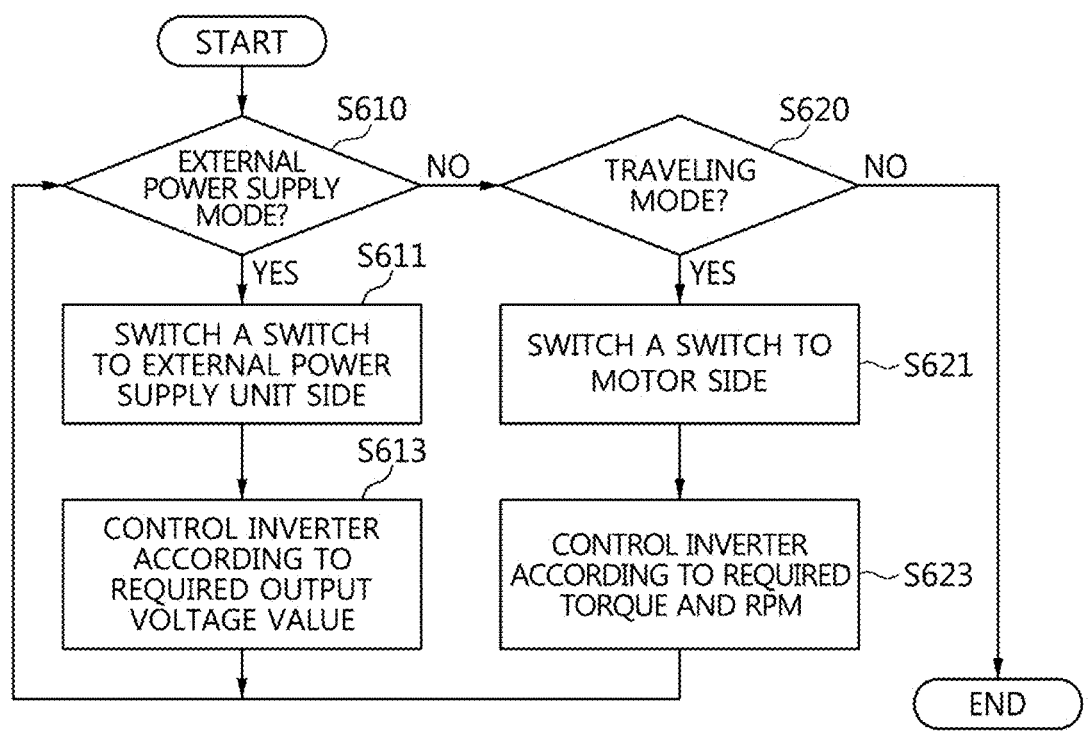
FIG. 6 is a flowchart illustrating a movable power generating procedure for a vehicle using a single motor and inverter according to an embodiment of the present disclosure.

FIG. 6 is a flowchart illustrating a movable power generating procedure for a vehicle using a single motor and inverter according to an embodiment of the present disclosure. Referring to FIG. 6, it is separated into the external power supply mode or the traveling mode S610, S620.

In the traveling mode, the motor control unit 220 switches the switch block 140 to the motor side, and performs a drive control S621, S623.

Alternatively, in the external power supply mode, the motor control unit 220 switches the switch to the external power supply unit 10 side, and controls the inverter 120 with the required constant voltage output S611, S613.

Figure 7:
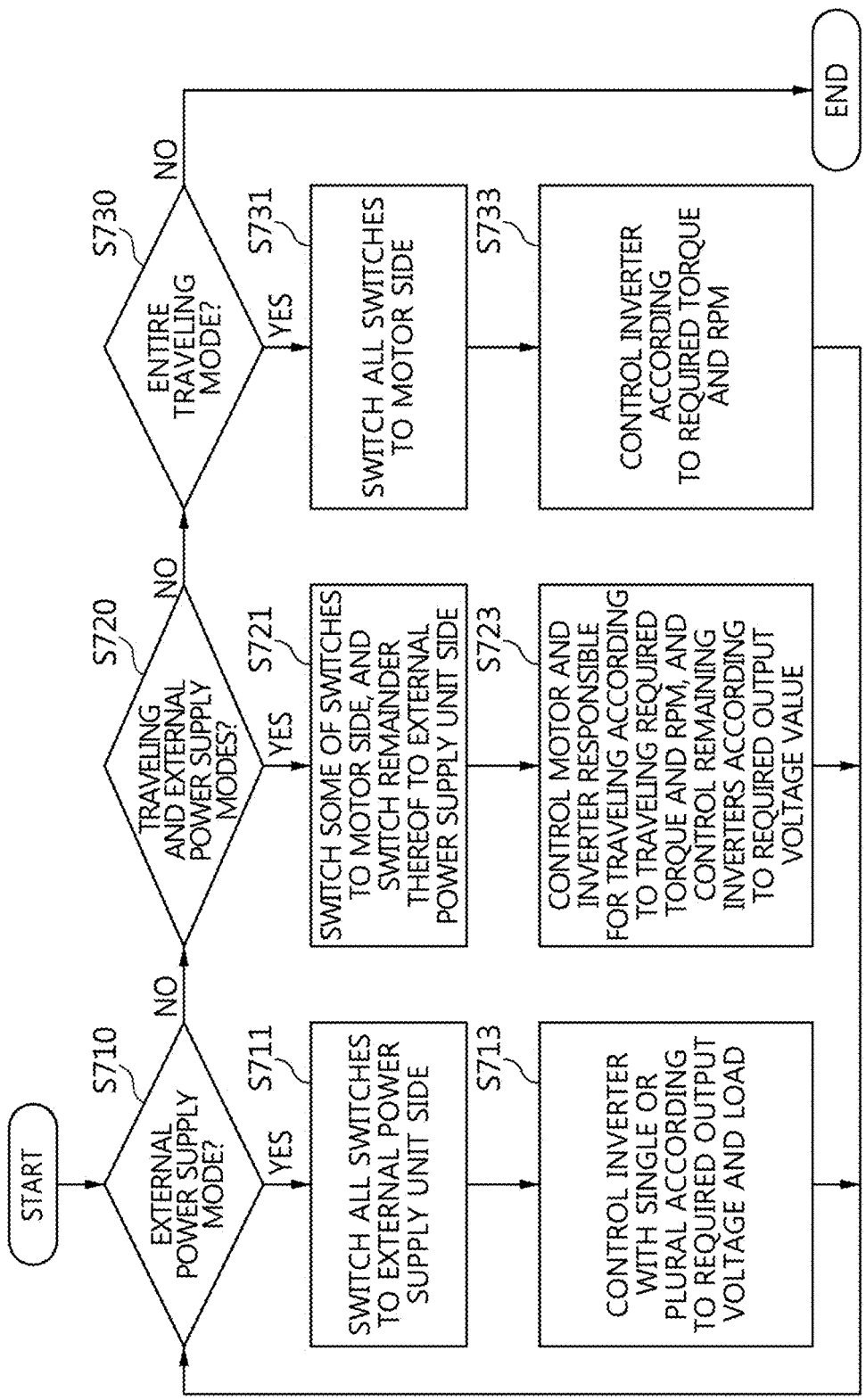
FIG. 7 is a flowchart illustrating a movable power generating procedure for a vehicle using a single motor and inverter according to another embodiment of the present disclosure.

FIG. 7 is a flowchart illustrating a movable power generating procedure for a vehicle using a plurality of motors and inverters according to another embodiment of the present disclosure. Referring to FIG. 7, it is separated into the entire traveling mode, the traveling and external power supply modes, and the external power supply mode S710, S720, S730.

In the entire traveling mode, the first and second motor control units 320-1, 320-2 switch the first and second switch blocks 340-1, 340-2 to the first and second motors 330-1, 330-2 side, and perform only a drive control S731, S733.

Alternatively, in the traveling and external power supply modes, the first and second motor control units 320-1, 320-2 switch the first or second switch blocks 340-1, 340-2 to the external power supply unit 10 side, one of the first and second inverters 120-1, 120-2 connected to one of the first and second motors 330-1, 330-2 performs a drive control, and the other inverter connected to the external power supply unit 10 side is controlled by the required constant voltage output S721, S723.

That is, the first inverter 120-1 and the first switch block 340-1 drive the first motor 330-1, and the second switch block 340-2 is switched to connect the output of the second inverter 120-2 to the external power supply unit 10 side.

Alternatively, in the external power supply mode, the first and second motor control units 320-1, 320-2 switch both the first and second switch blocks 340-1, 340-2 to the external power supply unit 10 side, and control one or both of the inverters according to the input required output voltage and load S711, S713.

Figure 8:
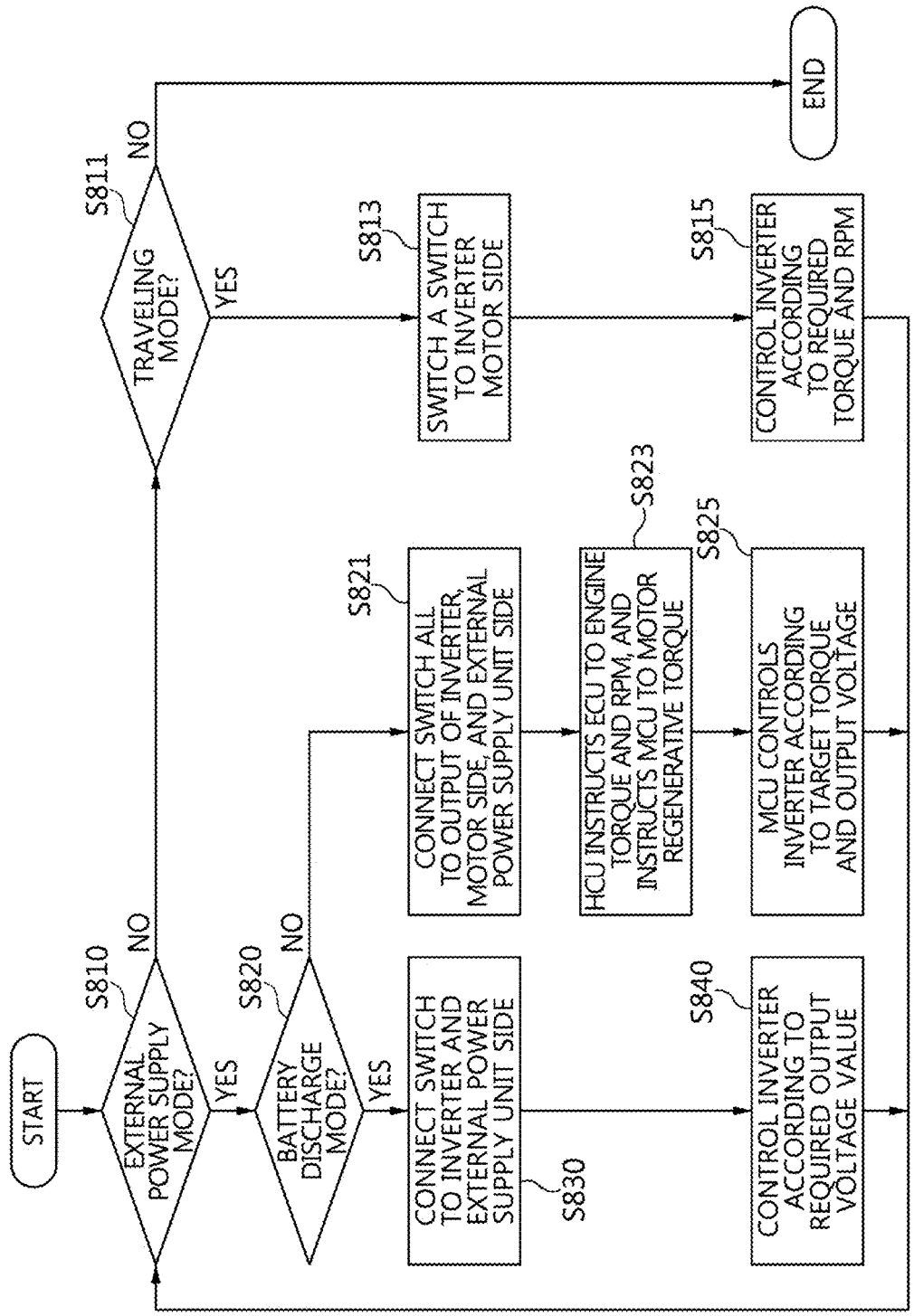
FIG. 8 is a flowchart illustrating a movable power generating procedure in another hybrid vehicle of the present disclosure.

FIG. 8 is a flowchart illustrating a movable power generating procedure in another hybrid vehicle of the present disclosure. Referring to FIG. 8, it is separated into the external power supply mode or the traveling mode S810, S811. As the separated result, in the traveling mode, the motor control unit 220 switches the switch block 140 to the motor 130 side, and performs a drive control S813, S815.

Alternatively, in the external power supply mode, the Battery Management System (BMS) 410 transmits the charged state of the battery 110 to the vehicle control unit 210 to determine the charge/discharge/charge hold modes of the battery 110 S820. As a result of the determination in S820, in the battery discharge mode, the vehicle control unit 210 switches the switch block 140 to the external power supply unit 10 side through the motor control unit 220, and controls the inverter 120 with the required constant voltage output S830, S840.

Alternatively, in the battery charge hold mode, the vehicle control unit 210 connects the switch block 140 to both the motor 130 and the external power supply unit 10 side through the motor control unit 220 S821. Thereafter, the vehicle control unit 210 drives the engine 40 with the engine torque and the engine RPM (revolution per minute) through the engine control unit 440 in order to satisfy the output of the external power supply unit 10 and the required charge amount of the battery 110. At the same time, the vehicle control unit 210 calculates the motor regenerative torque required therefor to control the inverter 120 and performs the charge of the battery 110 simultaneously with external power supply S823, S825. That is, when the charge of the battery is required in the external power supply mode, the control of the engine and/or the motor is performed.

At this time, the following equation is used.

$$\text{Motor regenerative torque }(Nm) = \frac{\{\text{external power supply load (W)} + \text{battery charge required power (W)}\} \times 60}{\text{motor inverter regenerative efficiency} \times \text{motor RPM }(rpm) \times 2\,pi} \quad \text{Equation 1}$$

That is, the motor regenerative torque is calculated by using the product of the motor inverter regenerative efficiency and the motor RPM, and the sum of the external power supply load and the battery charge required power.

$$\text{Engine torque }(Nm) = \frac{\text{motor regenerative torque}\,(Nm)}{\text{motor engine shift efficiency}}, \quad \text{Equation 2}$$

$$\text{Engine }RPM = \frac{\text{motor }RPM}{\text{engine motor shift ratio}}$$

That is, the engine torque is a value obtained by dividing the motor regenerative torque by the motor engine shift efficiency, and the engine RPM is a value obtained by dividing the motor RPM by the engine motor shift ratio.

Figure 9:
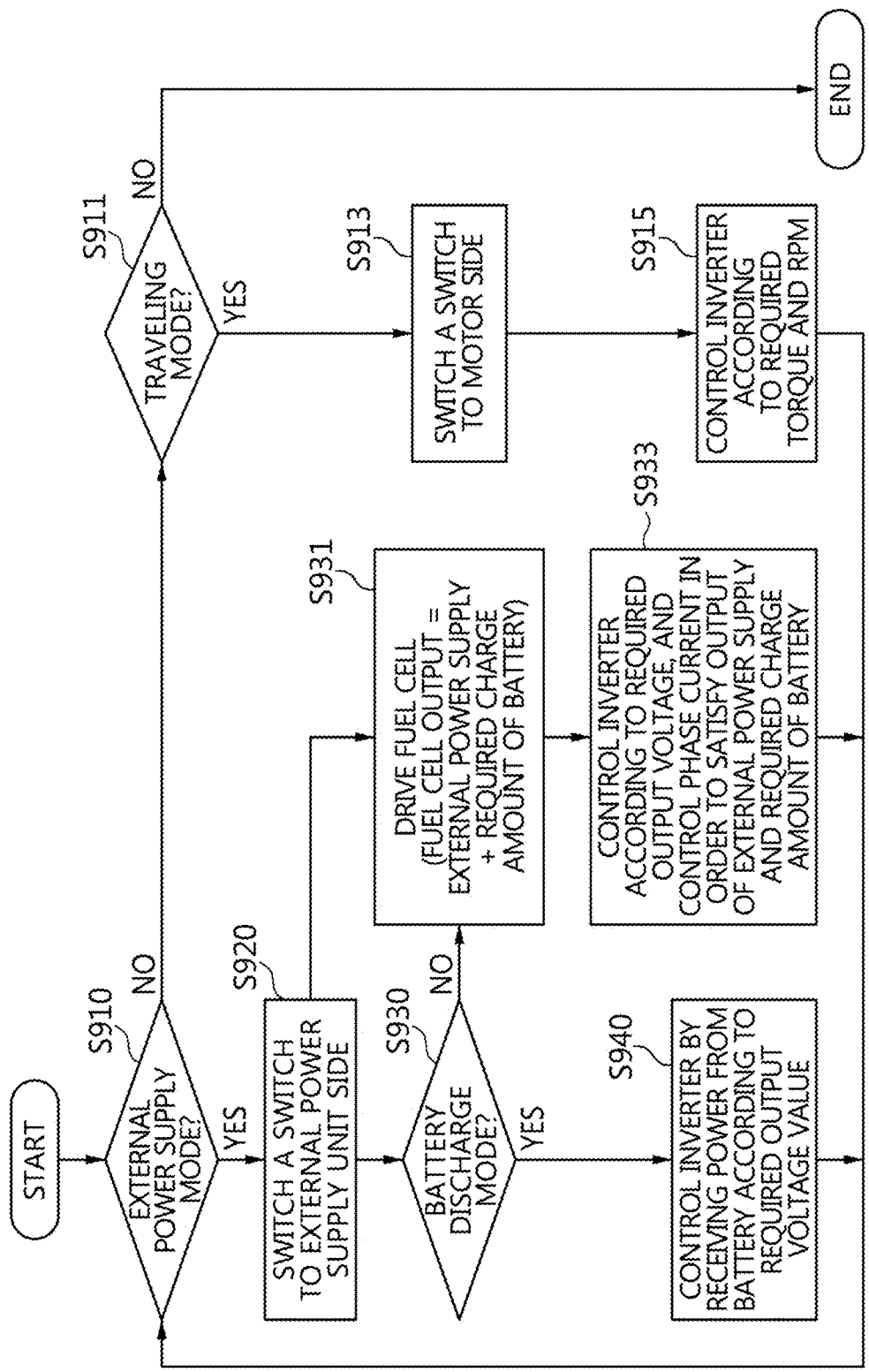
FIG. 9 is a flowchart illustrating a movable power generating procedure in a fuel cell vehicle according to still another embodiment of the present disclosure.

FIG. 9 is a flowchart illustrating a movable power generating procedure in a fuel cell vehicle according to still another embodiment of the present disclosure. Referring to FIG. 9, it is separated into the external power supply mode or the traveling mode S910, S911. As the separated result, in the traveling mode, the motor control unit 220 switches the switch block 140 to the motor 130 side, and performs a drive control S913, S915.

Alternatively, in the external power supply mode, the motor control unit 220 switches the switch block 140 to the external power supply unit 10 side, and controls the inverter 120 with the required constant voltage output S920.

Thereafter, the vehicle control unit 210 receives a charged state (e.g., SOC) from the BMS 410 of the battery 110 to determine the battery charge/discharge/charge hold modes S930. In S930, in the battery discharge mode, the battery 110 alone supplies power to the inverter 120 to supply external power S940 without driving a fuel cell.

Alternatively, in S930, in the battery charge hold mode, the fuel cell is operated to control the fuel cell 520 through the vehicle control unit 510 in order to satisfy the output of the external power supply unit 10 and the required charge amount of the battery 110 S931, S933. In the battery charge hold mode, the battery is charged by receiving the power from the fuel cell and the power generated by the inverter is provided to the external power supply unit side simultaneously. The battery is supplied with the power from the fuel cell and replenishes the output of the fuel cell. At this time, in the battery charge hold mode, the charge required power of the battery 110 may be zero.

Figure 10:
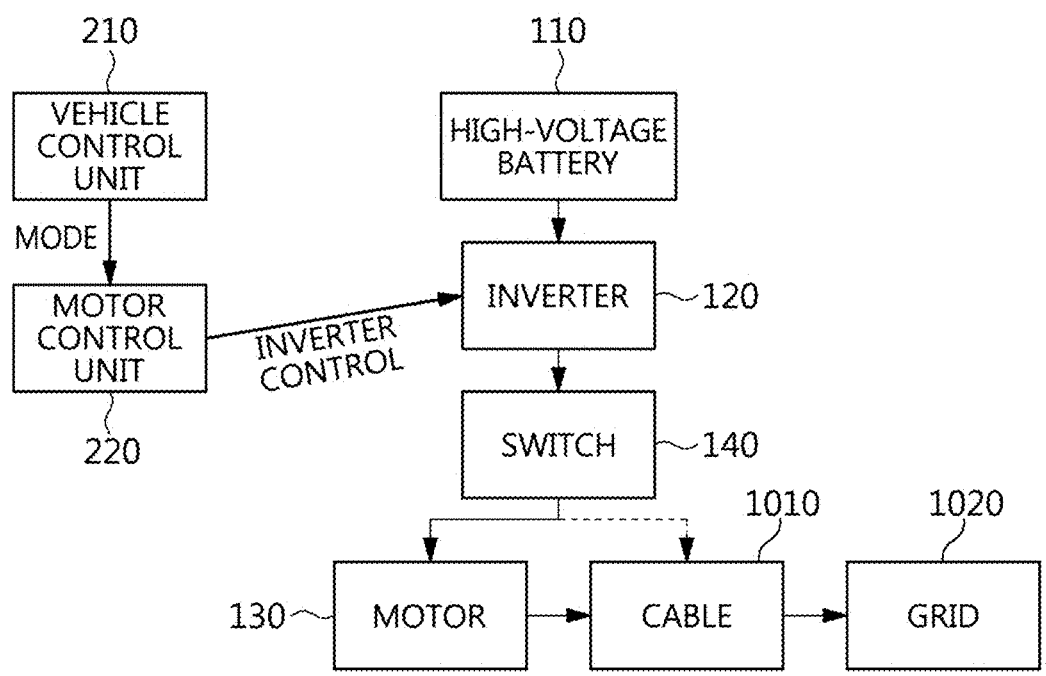
FIG. 10 is a conceptual diagram connecting a vehicle to a grid according to yet another embodiment of the present disclosure.

FIG. 10 is a conceptual diagram connecting a vehicle to a grid according to yet another embodiment of the present disclosure. Referring to FIG. 10, AC power may also be output to a connecting cable 1010. At this time, a charger (not illustrated) and a vehicle may be connected to supply power to a grid 1020, but the external power supply of the present disclosure means supplying power to the outside by not only a single electric device but also a connection to a grid.

Figure 11:
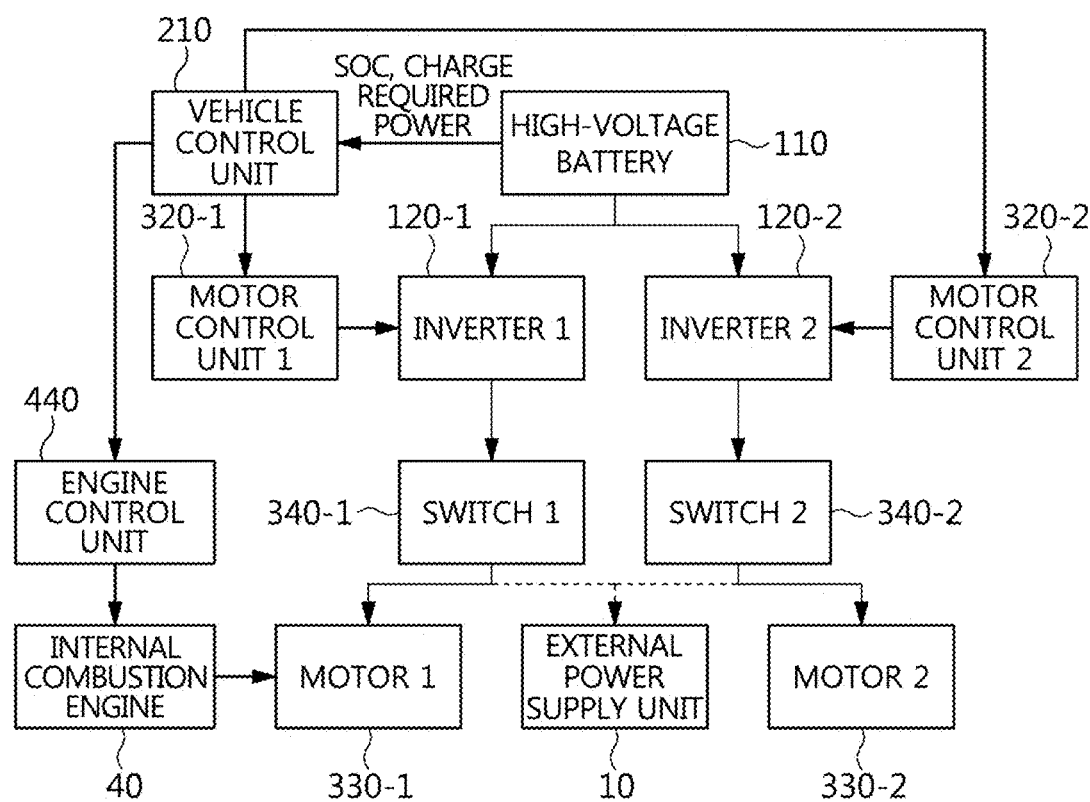
FIG. 11 is a conceptual diagram in which a plurality of motors and inverters are configured in a fuel cell or a hybrid vehicle according to still yet another embodiment of the present disclosure.

FIG. 11 is a conceptual diagram in which a plurality of motors and inverters are configured in a fuel cell or a hybrid vehicle according to still yet another embodiment of the present disclosure. Referring to FIG. 11, when a plurality of motors and inverters are mounted in a fuel cell or a hybrid vehicle, the driving and external power supply may be performed simultaneously in a manner similar to an electric vehicle equipped with a plurality of motors/inverters. In addition, the method for driving and supplying power to the outside simultaneously through a plurality of motors-inverters is the same (driving by an internal combustion engine, the external power is supplied to the inverter, and the like).

While a number of exemplary aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

The invention claimed is:

1. A movable power generating system for a vehicle, comprising:
    an inverter for receiving power from a battery in a vehicle to generate a plurality alternating current (AC) powers;
    a motor for receiving a first AC power of the plurality of AC powers from the inverter;
    a switch block connected to the output terminal of the inverter and for switching a second AC power of the plurality of AC powers or the first AC power; and
    an external power supply unit connected to the switch block and for outputting the second AC power;
    wherein the first AC power and the second AC power are different powers, and the inverter supplies the different powers to the motor and to the external power supply unit, which supplies high capacity power to an outside device without adding a separate power electronic part.

2. The movable power generating system for the vehicle of claim 1, further comprising a vehicle controller for determining selectively an operation of the vehicle as a traveling mode for switching the switch block to the motor side or an external power supply mode for switching the switch block to the external power supply unit side.

3. The movable power generating system for the vehicle of claim 2, wherein the inverter is controlled by a constant voltage output according to an input required output voltage value in the external power supply mode.

4. The movable power generating system for the vehicle of claim 3, wherein the input required output voltage value is a predetermined basic voltage which may be determined by country or technical standard.

5. The movable power generating system for the vehicle of claim 3, wherein the input required output voltage value is a predetermined value stored in a memory within the vehicle or is input through an Audio Visual Navigation (AVN) or a communication terminal connected to the vehicle.

6. The movable power generating system for the vehicle of claim 1, wherein a plurality of the inverters, a plurality of the switch blocks, and a plurality of the motors may be configured, and the movable power generating system comprises a vehicle controller for determining selectively an operation of the vehicle as an entire traveling mode for switching the switch blocks to the motors side, traveling and external power supply modes for switching some of the switch blocks to some side of the motors and the remainder of the switch blocks to the external power supply unit side, or an external power supply mode for switching all the switch blocks to the external power supply unit side.

7. The movable power generating system for the vehicle of claim 1, wherein the external power supply unit is an external connecting cable for connecting to an outlet or an external grid.

8. A movable power generating system for the vehicle, comprising:
a motor for generating a first AC power according to the driving of an engine in a vehicle and supplying the first AC power to an inverter;
a switch block connected to the output terminal of the inverter and for switching a second AC power generated from the inverter or the first AC power; and
an external power supply unit connected to the switch block and for outputting the AC power;
wherein the first AC power and the second AC power are different powers, and the inverter supplies the different powers to the motor and to the external supply unit, which supplies high capacity power to an outside device without adding a separate power electronic part.

9. The movable power generating system for the vehicle of claim 8, further comprising a vehicle controller for determining selectively an operation of the vehicle as a traveling mode for switching the switch block to the motor side or an external power supply mode for switching the switch block to the external power supply unit side, and the external power supply mode is composed of a battery discharge mode for switching the switch block to the external power supply unit side according to the charged state of a battery and a battery charge hold mode for connecting the switch block to the motor and the external power supply unit side.

10. The movable power generating system for the vehicle of claim 9, wherein the battery charge hold mode drives an engine with an engine torque and an engine revolution per minute (RPM) that are pre-calculated to satisfy the output of the external power supply unit and the required charge amount of the battery, and controls the inverter through the motor regenerative torque calculated according to the driving of the engine.

11. The movable power generating system for the vehicle of claim 10, wherein the charge required power of the battery in the battery charge hold mode is zero.

12. The movable power generating system for the vehicle of claim 10, wherein the motor regenerative torque is calculated by using the product of a motor inverter regenerative efficiency and a motor RPM and the sum of an external power supply load and a battery charge required power.

13. The movable power generating system for the vehicle of claim 12, wherein the engine torque is a value obtained by dividing the motor regenerative torque by motor engine shift efficiency, and the engine RPM is a value obtained by dividing the motor RPM by an engine motor shift ratio.

14. A movable power generating system for a vehicle, comprising:
an inverter for receiving power of a fuel cell in a vehicle to generate a plurality of AC powers;
a motor for receiving a first AC power of the plurality of AC powers from the inverter;
a switch block connected to the output terminal of the inverter and for switching a second AC power of the plurality of AC powers or the first AC power; and
an external power supply unit connected to the switch block and for outputting the second AC power;
wherein the first AC power and the second AC power are different powers, and the inverter supplies the different powers to the motor and the external power supply unit, which supplies high capacity power to an outside device without adding a separate power electronic part.

15. The movable power generating system for the vehicle of claim 14, further comprising a vehicle controller for determining selectively an operation of the vehicle as a traveling mode for switching the switch block to the motor side or an external power supply mode for switching the switch block to the external power supply unit side, and the external power supply mode is composed of a battery discharge mode for switching the switch block to supply power of a battery to the external power supply unit side without driving the fuel cell and a battery charge hold mode for simultaneously charging the battery and providing the second AC power generated by the inverter to the external power supply unit side with driving the fuel cell.

16. The movable power generating system for the vehicle of claim 15, wherein in the battery discharge mode, the battery alone supplies power to the inverter according to an input required output voltage value.

17. The movable power generating system for the vehicle of claim 15, wherein the battery charge hold mode drives the fuel cell in order to satisfy the output of the external power supply unit and the required charge amount of the battery.

* * * * *